United States Patent
Hasegawa

(10) Patent No.: US 9,178,729 B2
(45) Date of Patent: Nov. 3, 2015

(54) WIRELESS COMMUNICATION APPARATUS AND WIRELESS COMMUNICATION METHOD

(71) Applicant: FUJITSU LIMITED, Kawasaki-shi, Kanagawa (JP)

(72) Inventor: Tsuyoshi Hasegawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/972,005

(22) Filed: Aug. 21, 2013

(65) Prior Publication Data

US 2014/0133541 A1    May 15, 2014

(30) Foreign Application Priority Data

Nov. 15, 2012 (JP) ................... 2012-251702

(51) Int. Cl.
*H04B 7/04* (2006.01)
*H04L 25/03* (2006.01)
*H04B 7/08* (2006.01)

(52) U.S. Cl.
CPC ........ *H04L 25/03949* (2013.01); *H04B 7/0413* (2013.01); *H04B 7/0456* (2013.01); *H04B 7/0854* (2013.01); *H04L 25/03968* (2013.01)

(58) Field of Classification Search
CPC .. H04B 7/0413; H04B 7/0854; H04B 7/0456; H04B 7/08; H04L 25/03949; H04L 25/03968
USPC ............... 375/267, 340, 347, 349, 350
See application file for complete search history.

(56) References Cited

U.S. PATENT DOCUMENTS

| | | | |
|---|---|---|---|
| 8,036,295 B2 | 10/2011 | Yoshida | |
| 8,526,296 B2 | 9/2013 | Ozaki | |
| 2007/0291882 A1* | 12/2007 | Park et al. | 375/347 |
| 2009/0129456 A1 | 5/2009 | Miyatani | |
| 2010/0027693 A1* | 2/2010 | Vijayan et al. | 375/260 |
| 2010/0117904 A1 | 5/2010 | Miyatani | |
| 2011/0292983 A1* | 12/2011 | Ito | 375/224 |

FOREIGN PATENT DOCUMENTS

| | | |
|---|---|---|
| JP | 2006-222743 | 8/2006 |
| JP | 2008-258899 | 10/2008 |
| JP | 2009-130516 | 6/2009 |
| JP | 2010-118905 | 5/2010 |

OTHER PUBLICATIONS

Extended European Search Report dated Feb. 20, 2014 for corresponding European Application No. 13180702.6.
Dirk Wubben, et al., "MMSE Extension of V-BLAST based on Sorted QR Decomposition", IEEE 2003, pp. 508-512.

* cited by examiner

*Primary Examiner* — Betsy Deppe
(74) *Attorney, Agent, or Firm* — Fujitsu Patent Center

(57) ABSTRACT

A wireless communication apparatus includes a wireless section configured to receive a plurality of signals via a plurality of antennae from a transmitting device having another plurality of antennae; and a demodulation section configured to apply QR decomposition to a channel matrix generated based on the received signals from the wireless section, to extract a plurality of weight coefficients corresponding to a symbol to be demodulated from a unitary matrix Q, to filter the received signals weighted with the weight coefficients, and to separate the filtered received signals based on a submatrix of an upper triangular matrix R.

10 Claims, 14 Drawing Sheets

FIG.6

$$H' \begin{pmatrix} a & b & c \\ d & e & f \\ g & h & i \end{pmatrix} \longrightarrow H'' \begin{pmatrix} a & b & c \\ d & e & f \\ g & h & i \\ \sigma & 0 & 0 \\ 0 & \sigma & 0 \\ 0 & 0 & \sigma \end{pmatrix}$$

WIRELESS COMMUNICATION APPARATUS AND WIRELESS COMMUNICATION METHOD

CROSS-REFERENCE TO RELATED APPLICATIONS

This application is based upon and claims the benefit of priority of the prior Japanese Priority Application No. 2012-251702 filed on Nov. 15, 2012, the entire contents of which are hereby incorporated by reference.

FIELD

The disclosures herein relate to a wireless communication apparatus.

BACKGROUND

As a mobile wireless communication method, MIMO (Multiple-Input Multiple-Output) method is known that uses multiple antennae for transmitting radio signals. Especially, MIMO demodulation becomes simplified if MIMO-multiplexed transmission is used for OFDM (Orthogonal Frequency-Division Multiplexing) access. This is because signal separation can be implemented with high precision without being influenced by multipath interference.

LTE (Long Term Evolution) is one of the concrete wireless communication methods that use MIMO-multiplexed transmission for OFDM access.

Various technologies have been proposed for signal separation in MIMO technology.

Among the signal separation technologies in MIMO technology, it is considered to be realistic to adopt the MLD (Maximum-Likelihood Detection) method. This is because interference from adjacent symbols is small in subcarriers of OFDM.

In contrast with OFDM, in a wireless communication method that is greatly influenced by multipath interference such as CDMA (Code Division Multiple Access), a number of adjacent symbols should be taken into account. It is not realistic to use MLD because consideration for a number of symbols induces an exponential increase of processing amount of MLD.

To reduce such a processing amount of MLD, a method is known in that multipath interference is removed by a multipath interference canceler based on MMSE (Minimum Mean Square Error) before processing with MLD.

RELATED-ART DOCUMENTS

Non-Patent Documents

[Non-Patent Document 1] Dirk Wubben et al, "MMSE Extension of V-BLAST based on Sorted QR Decomposition", IEEE 2003

When removing multipath interference by a multipath interference canceler, a considerable amount of calculation is required. With such a considerable amount of calculation, there is a risk in that power consumption is increased when applying a multipath interference removal process with a multipath interference canceler in a portable terminal. There is also a risk in that the size of a portable terminal becomes larger when applying a multipath interference removal process by a multipath interference canceler in a portable terminal.

SUMMARY

According to an embodiment, a wireless communication apparatus includes a wireless section configured to receive a plurality of signals via a plurality of antennae from a transmitting device having another plurality of antennae; and a demodulation section configured to apply QR decomposition to a channel matrix generated based on the received signals from the wireless section, to extract a plurality of weight coefficients corresponding to a symbol to be demodulated from a unitary matrix Q, to filter the received signals weighted with the weight coefficients, and to separate the filtered received signals based on a submatrix of an upper triangular matrix R.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF DRAWINGS

FIG. 6 is a schematic view illustrating a weight calculating process according to a modified example;

DESCRIPTION OF EMBODIMENTS

In the following, embodiments will be described with reference to the drawings. Here, the same functions across the drawings are assigned with the same numerical codes, and their repeated description may be omitted.

<Wireless Communication Apparatus>

Figure 1:
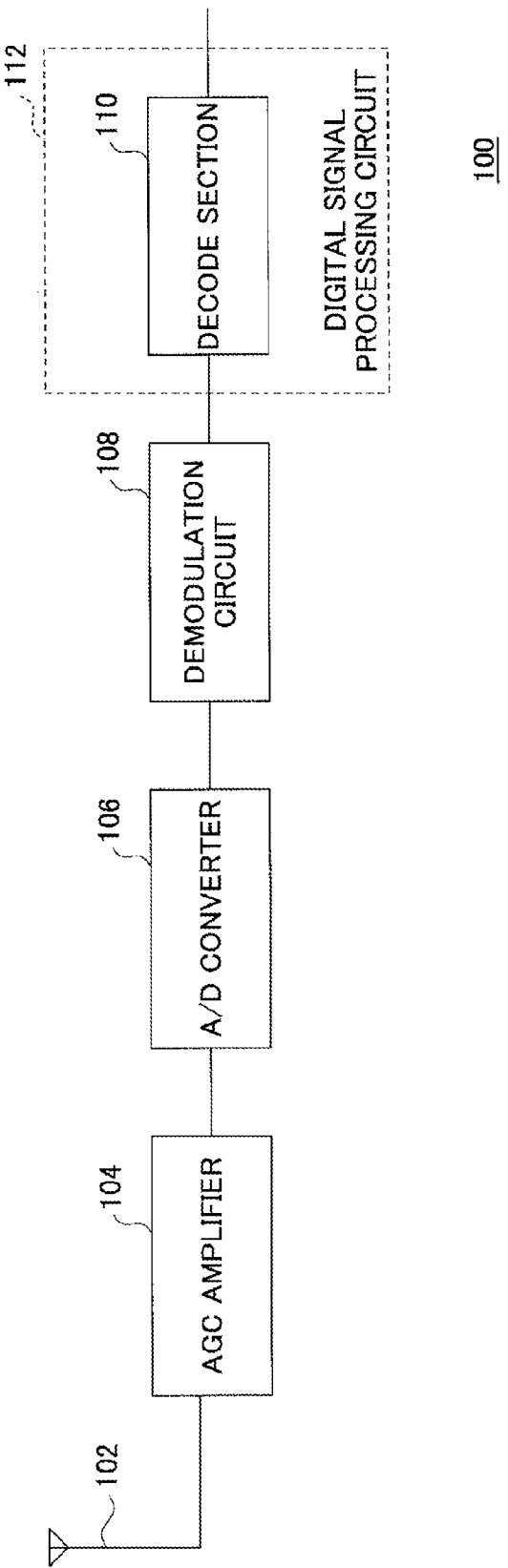
FIG. 1 is a schematic view illustrating a wireless communication apparatus according to an embodiment.

FIG. 1 is a schematic view illustrating a wireless communication apparatus 100 according to an embodiment. The wireless communication apparatus 100 can be used for a user terminal or a base station. FIG. 1 mainly illustrates a hardware configuration. In FIG. 1, analog elements are omitted. Specifically, duplexers, filters, downconverters, low-noise amplifying circuits (LNA: Low Noise Amplifiers), and the like are omitted. Also, although FIG. 1 is illustrated for a branch of an antenna, it is possible to provide multiple antennae along with AGCs and A/D converters for receiving MIMO-multiplexed radio signals to input the signals into a demodulation circuit 108.

The wireless communication apparatus 100 includes an antenna 102, an AGC (Automatic Gain Control) amplifier 104, an A/D converter 106, a demodulation circuit 108, and a digital signal processing circuit 112.

The antenna 102 receives a signal sent by another wireless communication apparatus having multiple antennae.

The AGC amplifier 104 is connected with the antenna 102. The AGC amplifier 104 automatically adjusts gain of a built-in amplifying circuit. For example, the AGC amplifier 104 may automatically adjust gain when a received signal is downconverted to an IF band and its amplitude fluctuates. The AGC amplifier 104 automatically adjusts gain of the built-in amplifying circuit, and outputs a linearly amplified signal to the A/D converter 106.

The A/D converter 106 is connected with the AGC amplifier 104. The A/D converter 106 converts an analog signal from the AGC amplifier 104 into a digital signal. The A/D converter 106 inputs the digital signal to the demodulation circuit 108.

The demodulation circuit 108 is connected with the A/D converter 106. Based on the digital signal from the A/D converter 106, the demodulation circuit 108 executes synchronized detection, separation of an MIMO-multiplexed signal, and the like. The MIMO-multiplexed signal separated by the demodulation circuit 108 is input to the digital signal processing circuit 112 after a log-likelihood ratio (LLR) is calculated for each bit.

The digital signal processing circuit 112 is connected with the demodulation circuit 108. The digital signal processing circuit 112 includes a decoding section 110. The decoding section 110 executes error correction based on the output signal from the demodulation circuit 108. The decoding section 110 outputs a bit sequence of 0 s and 1 s obtained as a result of error correction.

<Demodulation Process>

Suppose, for example, that signals sent from two transmitting antennae are received by two receiving antennae, and s denotes a two-dimensional transmitting signal vector, v denotes a two-dimensional received signal vector, n denotes a two-dimensional noise vector, and H denotes a 2×2 channel matrix. The received signal vector v is represented by Formula (1).

$$v = Hs + n \quad (1)$$

The channel matrix H has components corresponding to channel response values between the transmitting/receiving antennae. In other words, the channel matrix H represents characteristics of propagation channels from the transmitting antennae T1 and T2 to the receiving antennae R1 and R2. Components may be called "elements". The transmitting signal vector s is a transmitting signal vector from the transmitting antennae T1 and T2. The noise vector n represents Gaussian noise. According to the present embodiment, the number of antennae is assumed to be two. In this case, symbols transmitted from the transmitting antennae T1 and T2 may be represent by transmitting signal vectors $s_1$, $s_2$, respectively, and, for example, s1 can be a column vector $s_1=(s_{1,1}, s_{1,2}, \ldots, s_{1,Nt})^T$ with the length $N_t$, or the like. This represents that $N_t$ symbols are continuously and concurrently sent from the antennae. s is, then, a vector having $s_1$ and $s_2$ arranged vertically. Namely, s is a column vector with the length $2 \times N_t$. Formula (1) can be rewritten as Formula (2).

$$\begin{pmatrix} v_1 \\ v_2 \end{pmatrix} = \begin{pmatrix} H_{11} & H_{12} \\ H_{21} & H_{22} \end{pmatrix} \begin{pmatrix} s_1 \\ s_2 \end{pmatrix} + \begin{pmatrix} n_1 \\ n_2 \end{pmatrix} \quad (2)$$

In Formula (2), $v_1$ and $v_2$ denote received signal vectors, $s_1$ and $s_2$ denote transmitting signal vectors, $H_{11}$, $H_{12}$, $H_{21}$, and $H_{22}$ denote component matrixes in the channel matrix H, and $n_1$ and $n_2$ denote noise vectors. The channel matrix H is represented based on unchanged semi-static multi-path fading while transmitting $N_t$ symbols. Assuming the length of a path profile is $N_p$ [chip], $H_{11}$ or the like ($H_{12}$, $H_{21}$, or $H_{22}$) is a $(N_t+N_p-1) \times N_t$ matrix. H is a matrix two times greater than $H_{11}$ or the like vertically and horizontally. $v_1$ and $v_2$ are received signal vectors from the receiving antennae R1 and R2 with the length of $(N_t+N_p-1)$.

Here, the channel matrix H, as represented in Formula (3), can be decomposed into a unitary matrix Q (with which a unit matrix is obtained when applied with matrix product with the complex conjugate matrix transpose Q*) and an upper triangular matrix R (QR decomposition).

$$H = QR \quad (3)$$

where R is represented by Formula (4).

$$R = \begin{pmatrix} a & b \\ o & c \end{pmatrix} \quad (4)$$

In the following, the MLD method will be described.

<MLD Method>

The MLD method is a signal separation method based on maximum likelihood estimation. It generates a received signal replica using the channel matrix estimated for all combinations of transmitting signal candidates $c_p$'s in digital modulation at all transmitting antennae p's. Based on a squared Euclidean distance between a received signal and its received signal replica for all candidates, a metric e is calculated as represented by Formula (5), which is an example for four transmitting antennae (p=4).

$$e = \left\| v - \hat{H} \begin{bmatrix} c_1 \\ c_2 \\ c_3 \\ c_4 \end{bmatrix} \right\|^2 \quad (5)$$

A signal separation is executed by selecting a combination of transmitting symbol candidates $c_p$ (p=1, ..., 4) that give a minimum metric e with Formula (5).

The demodulation circuit 108 applies an equalization process to a received signal before applying a demodulation process using the MLD method according to the present embodiment. By applying such an equalization process to a received signal, the amount of calculation can be reduced than when using a multipath interference canceler.

<Demodulation Circuit 108>

Figure 2:
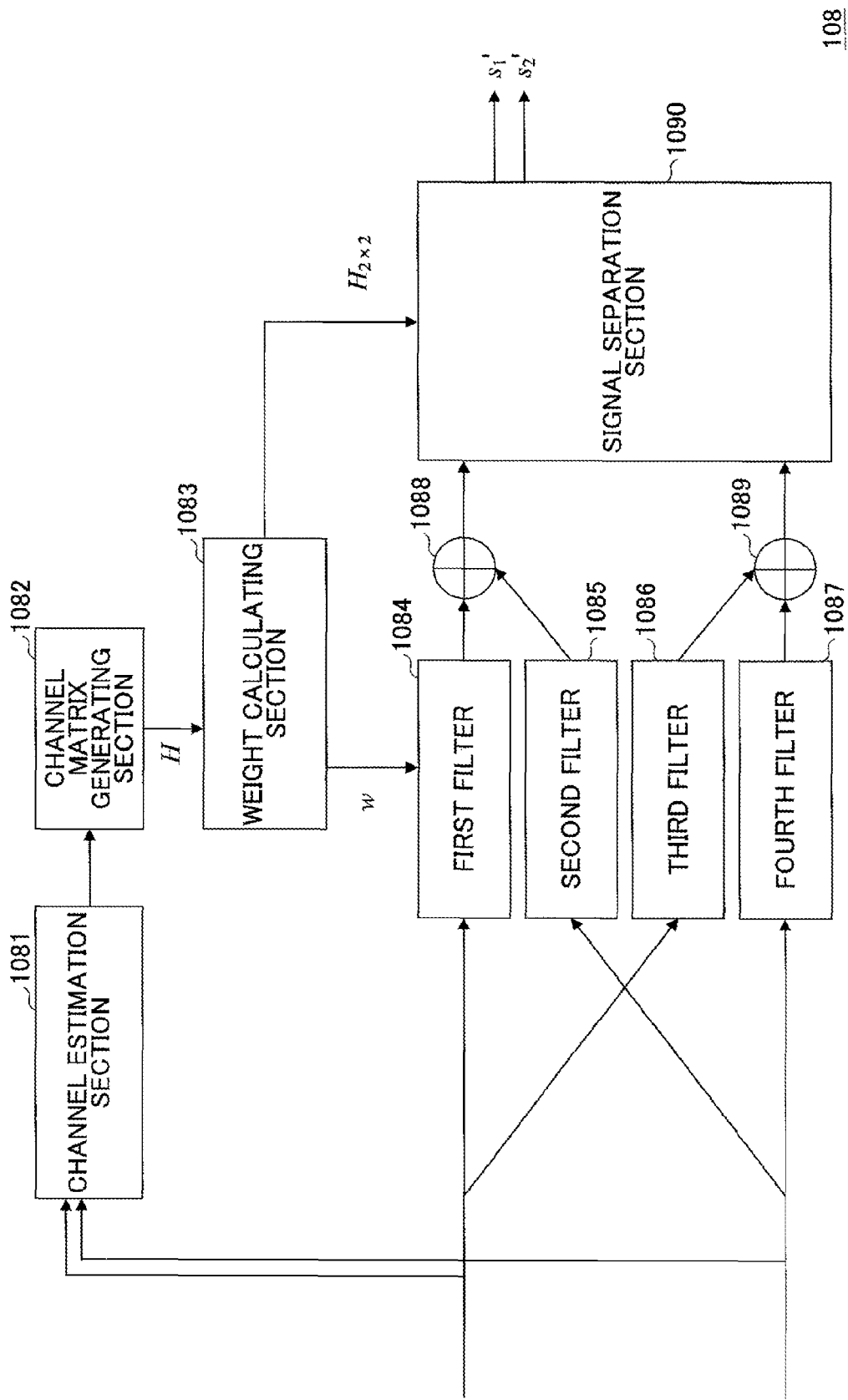
FIG. 2 is a schematic view illustrating a demodulation circuit according to an embodiment.

FIG. 2 is a schematic view illustrating a demodulation circuit 108 according to the present embodiment. The wireless communication apparatus 100 illustrated in FIG. 2 has two antennae. The wireless communication apparatus 100 receives a signal from another wireless communication apparatus with two antennae. If the wireless communication apparatus 100 provides more than two antennae and receives a signal from another wireless communication apparatus with more than two antennae, it is basically the same.

The demodulation circuit 108 includes a channel estimation section 1081, a channel matrix generating section 1082, a weight calculating section 1083, a first filter 1084, a second filter 1085, a third filter 1086, a fourth filter 1087, a first adder 1088, a second adder 1089, and a signal separation section 1090.

Functions of the channel estimation section 1081, the channel matrix generating section 1082, the weight calculating section 1083, the first filter 1084, the second filter 1085, the third filter 1086, the fourth filter 1087, the first adder 1088, the second adder 1089, and signal separation section 1090 are implemented with hardware (digital circuit) or a semiconductor LSI including a processor such as a DSP (Digital Signal Processor) and the like. Alternatively, the functions of the channel estimation section 1081, the channel matrix generating section 1082, the weight calculating section 1083, the first filter 1084, the second filter 1085, the third filter 1086, the fourth filter 1087, the first adder 1088, the second adder 1089, and signal separation section 1090 may be implemented with software.

The channel estimation section 1081 executes channel estimation to represent a characteristic of a transmission line between a transmitting antenna and a receiving antenna for each subcarrier signal based on signals from the antennae. The channel estimation section 1081 inputs the channel estimation values to the channel matrix generating section 1082.

The channel matrix generating section 1082 is connected with the channel estimation section 1081. The channel matrix generating section 1082 generates a channel matrix H based on the channel estimation values from the channel estimation section 1081. The channel matrix generating section 1082 inputs the channel matrix H into the weight calculating section 1083.

The weight calculating section 1083 is connected with the channel matrix generating section 1082. The weight calculating section 1083 calculates weights w that are used for the filters, the first filter 1084 to the fourth filter 1087, based on the channel matrix H from the channel matrix generating section 1082.

FIGS. 3A-3D are schematic views illustrating a weight calculating process according to the present embodiment.

Figure 3A:
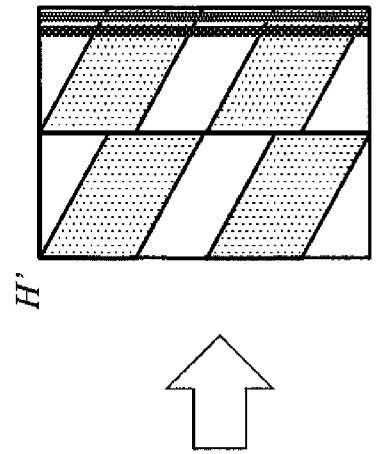
FIGS. 3A-3D are schematic views illustrating a weight calculating process according to an embodiment.

FIG. 3A illustrates a channel matrix H generated by the channel matrix generating section 1082. In the channel matrix H in FIGS. 3A-3C, components in shaded areas mainly include non-zero values, and areas other than the shaded areas include zero or nearly zero values. There are cases that a channel matrix for a single carrier signal includes the same values in a diagonal direction.

The weight calculating section 1083 selects channels at a timing for demodulation from multiple column vectors included in the channel matrix H. The weight calculating section 1083 may select the same number of column vectors as the number of the antennae of a transmitting wireless communication apparatus, or more numbers of column vectors than the number of the antennae of the transmitting wireless communication apparatus. Here, it is assumed that the wireless communication apparatus 100 receives a signal from a wireless communication apparatus with two antennae. Namely, the wireless communication apparatus 100 is described with a case where two channels 302 and 304 are selected.

Figure 3B:
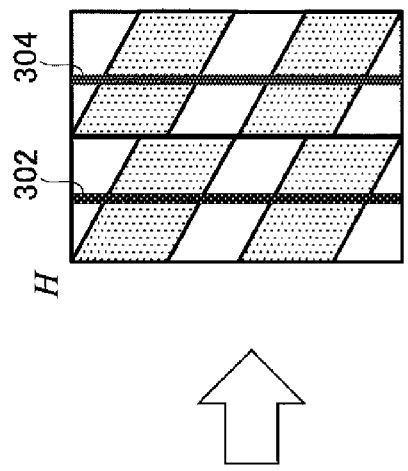

FIG. 3B illustrates an example where two channels 302 and 304 are selected.

The weight calculating section 1083 moves components included in the two channels 302 and 304 selected in the channel matrix H to the right end. A matrix that corresponds to the channel matrix H having the selected two channels 302 and 304 moved to the right end is called a channel matrix H'. The components of the selected two channels 302 and 304 may be exchanged with the components of the two rightmost end columns of the channel matrix H. Alternatively, the components of the selected two channels 302 and 304 may be moved to the right end, and other components may be shifted to the left.

Figure 3C:
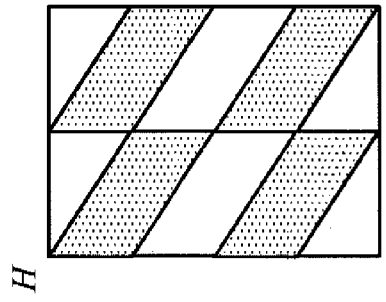

FIG. 3C illustrates a channel matrix H' in which the selected two channels 302 and 304 are moved to the right end, and other components are shifted to the left.

The weight calculating section 1083 applies QR decomposition to the channel matrix H'.

Figure 3D:
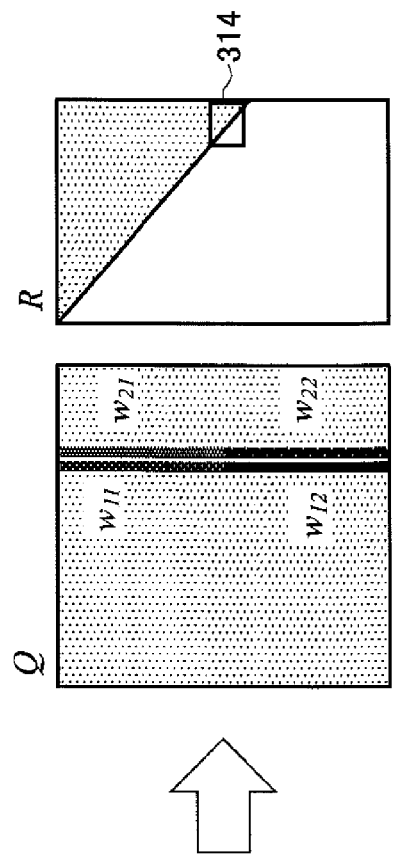

FIG. 3D illustrates examples of Q matrix and R matrix obtained by QR decomposition of the channel matrix H'.

By applying orthogonal transform to a received signal with Q matrix, a signal can be generated that includes the signal at a timing for demodulation. In case of MIMO, a signal that includes the signal at a timing for demodulation may include another signal.

By executing weighted addition using a specific column vector in Q matrix, the received signal can be equalized. Therefore, the specific column vector in Q matrix can be used as weights for the first filter 1084 to the fourth filter 1087. FIG. 3D illustrates $w_{11}$, $w_{12}$, $w_{21}$, and $w_{22}$ as the weights for the first filter 1084 to the fourth filter 1087, respectively.

The weight calculating section 1083 generates a submatrix (called a "submatrix $H_{2\times2}$" hereafter) 314 in which a part of components in R matrix are extracted. The wireless communication apparatus 100 generates a 2×2 matrix according to the present embodiment. For the submatrix $H_{2\times2}$ 314, it is preferable to extract components from R matrix where the left side components are all zero. By generating the submatrix $H_{2\times2}$ 314 with extracting components where the left side components are all zero, it is possible to generate an equalized signal that does not include multipath interference. Therefore, it is possible to efficiently execute signal separation without taking care of a multipath.

The weight calculating section 1083 inputs the weight $w_{11}$, $w_{12}$, $w_{21}$, and $w_{22}$ into the first filter 1084 to the fourth filter 1087. The weight calculating section 1083 also inputs the submatrix $H_{2\times2}$ 314 into the signal separation section 1090.

Figure 4:
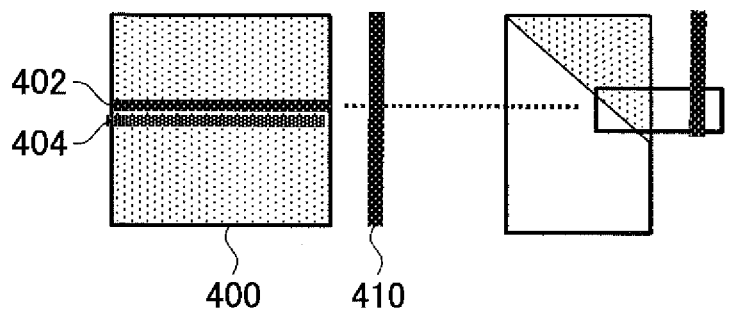
FIG. 4 is a schematic view illustrating a weight calculating process according to an embodiment.

FIG. 4 is a schematic view illustrating a process executed by the weight calculating section 1083 according to the present embodiment. In FIG. 4, an example is illustrated with formulae.

As described above, v denotes a received signal vector, s denotes a transmitting signal vector, and n denotes a noise vector.

The received signal vector is represented by v=Hs+n. By applying QR decomposition to H, v=QRs+n is obtained. Moreover, by multiplying both sides by the Hermitian transpose matrix of Q, $Q^H v = Rs + Q^H n$ is obtained.

The weight calculating section 1083 extracts a signal to be demodulated.

FIG. 4 illustrates a schematic view of the Hermitian transpose matrix $Q^H$ of Q, the received signal v, R matrix, and the transmitting signal vector s.

The signal to be demodulated is obtained by multiplying a first and a second rows 402 and 404 of the Hermitian transpose matrix $Q^H$ 400 by the received signal v 410.

When executing MLD, the submatrix $H_{2\times2}$ 314 is used as propagation channels, in which a part of components in R matrix is used.

The first filter 1084 executes filtering with giving a weight to the received signal with the weight $w_{11}$ from the weight calculating section 1083. The first filter 1084 inputs the filtered received signal weighted with the weight $w_{11}$ into the first adder 1088. For example, the first filter 1084 gives a weight to the received signal from the first antenna R1 and filters the signal.

The second filter 1085 executes filtering with giving a weight to the received signal with the weight $w_{12}$ from the weight calculating section 1083. The second filter 1085 inputs the filtered received signal weighted with the weight $w_{12}$ into the first adder 1088. For example, the second filter 1085 gives a weight to the received signal from the first antenna R1 and filters the signal.

The third filter 1086 executes filtering with giving a weight to the received signal with the weight $w_{21}$ from the weight calculating section 1083. The third filter 1086 inputs the filtered received signal weighted with the weight $w_{21}$ into the second adder 1089. For example, the third filter 1086 gives a weight to the received signal from the first antenna R2 and filters the signal.

The fourth filter 1087 executes filtering with giving a weight to the received signal with the weight $w_{22}$ from the weight calculating section 1083. The fourth filter 1087 inputs the filtered received signal weighted with the weight $w_{22}$ into the second adder 1089. For example, the fourth filter 1087 gives a weight to the received signal from the first antenna R2 and filters the signal.

The first adder 1088 adds the received signal that has been weighted with the weight $w_{11}$ from the first filter 1084 and filtered, and the received signal that has been weighted with the weight $w_{12}$ from the second filter 1084 and filtered. The first adder 1088 inputs the signal that is obtained by adding the received signal has been weighted with the weight $w_{11}$ and filtered, and the received signal has been weighted with the weight $w_{12}$ and filtered (called a "first added signal" hereafter) into the signal separation section 1090.

The second adder 1089 adds the received signal that has been weighted with the weight w21 from the third filter 1086 and filtered, and the received signal that has been weighted with the weight w22 from the fourth filter 1087 and filtered. The second adder 1089 inputs the signal that is obtained by adding the received signal has been weighted with the weight w21 and filtered, and the received signal has been weighted with the weight w22 and filtered (called a "second added signal" hereafter) into the signal separation section 1090.

The signal separation section 1090 executes signal separation based on the first added signal from the first adder 1088, the second added signal from the second adder 1089, and the submatrix $H_{2\times 2}$ 314 from the weight calculating section 1083.

The weight calculating section 1083 generates a channel matrix H' from the channel matrix H from the channel matrix generating section 1082. The weight calculating section 1083 applies QR decomposition to the channel matrix H' and extracts the weights $w_{11}$, $w_{12}$, $w_{21}$, and $w_{22}$ included in column vectors in Q matrix. The first filter 1084 to the fourth filter 1087 use the weight $w_{11}$, $w_{12}$, $w_{21}$, and $w_{22}$ as weights for an equalizer, respectively. Denoting the output signal from the first adder 1088 as $v_1'$ and the output signal from the second adder 1089 as $v_2'$, the signal v' input into the signal separation section 1090 is represented by Formula (6).

$$v' = \begin{pmatrix} v_1' \\ v_2' \end{pmatrix} = \begin{pmatrix} w_{11} & w_{21} \\ w_{12} & w_{22} \end{pmatrix}^H \begin{pmatrix} v_1 \\ v_2 \end{pmatrix} \quad (6)$$

In Formula (6), $v_1$ and $v_2$ are column vectors, and $v_1'$ and $v_2'$ are scalar values. Namely, v' is a column vector with two elements.

Also, the signal separation section 1090 receives the submatrix $H_{2\times 2}$ as input from the weight calculating section 1083. The submatrix $H_{2\times 2}$ is treated as propagation channels including the equalizer.

The signal separation section 1090 executes MLD using the first added signal $v_1'$, the second added signal $v_2'$, and the submatrix $H_{2\times 2}$. The signal processing section 1090 selects s' that gives a minimum square Euclidean distance e (s') between the received signal replica $H_{2\times 2}$s' obtained from the transmitting signal replica s' and v'. s' is a column vector with the size two, which is represented by Formula (7).

$$s' = \begin{pmatrix} s_1' \\ s_2' \end{pmatrix} \quad (7)$$

In Formula (7), $s_1'$ and $s_2'$ are replicas of the transmitting signals from the transmitting antennae. Also, e (s') is represented by Formula (8).

$$e(s') = \|H_{2\times 2}s' - v_m'\|^2 \quad (8)$$

According to the present embodiment of the wireless communication apparatus 100, QR decomposition is executed after moving channels at a timing for demodulation to the right side of the matrix among the propagation channels corresponding to the column vectors in H. The received signal is equalized using a part of columns in Q matrix obtained by QR decomposition as equalizing weights. In this way, a signal can be generated that includes a signal at a timing for demodulation. In case of MIMO, multiple signals are included in the signal at a timing for demodulation. Therefore, by executing MLD using the submatrix $H_{2\times 2}$ which is a submatrix of R matrix as a propagation channel for MIMO, interference between antennae are reduced.

The submatrix $H_{2\times 2}$ 314 is extracted from R matrix. As illustrated in FIG. 3, the left side components of the submatrix $H_{2\times 2}$ 314 are all zeros. All zeros in the left side components indicate that a signal after orthogonal transform does not include multipath interference. Therefore, it is possible to efficiently execute MLD without taking care of a multipath.

Also, when equalizing with Q matrix, specific column vectors in Q matrix are used as weights for addition, namely, $w_{11}$, $w_{12}$, $w_{21}$, are $w_{22}$ are used as weights for equalization.

First Modified Example

A wireless communication apparatus 100 according to a first modified example is substantially the same as the one illustrated in FIG. 1.

<Demodulation Circuit 108>

Figure 5:
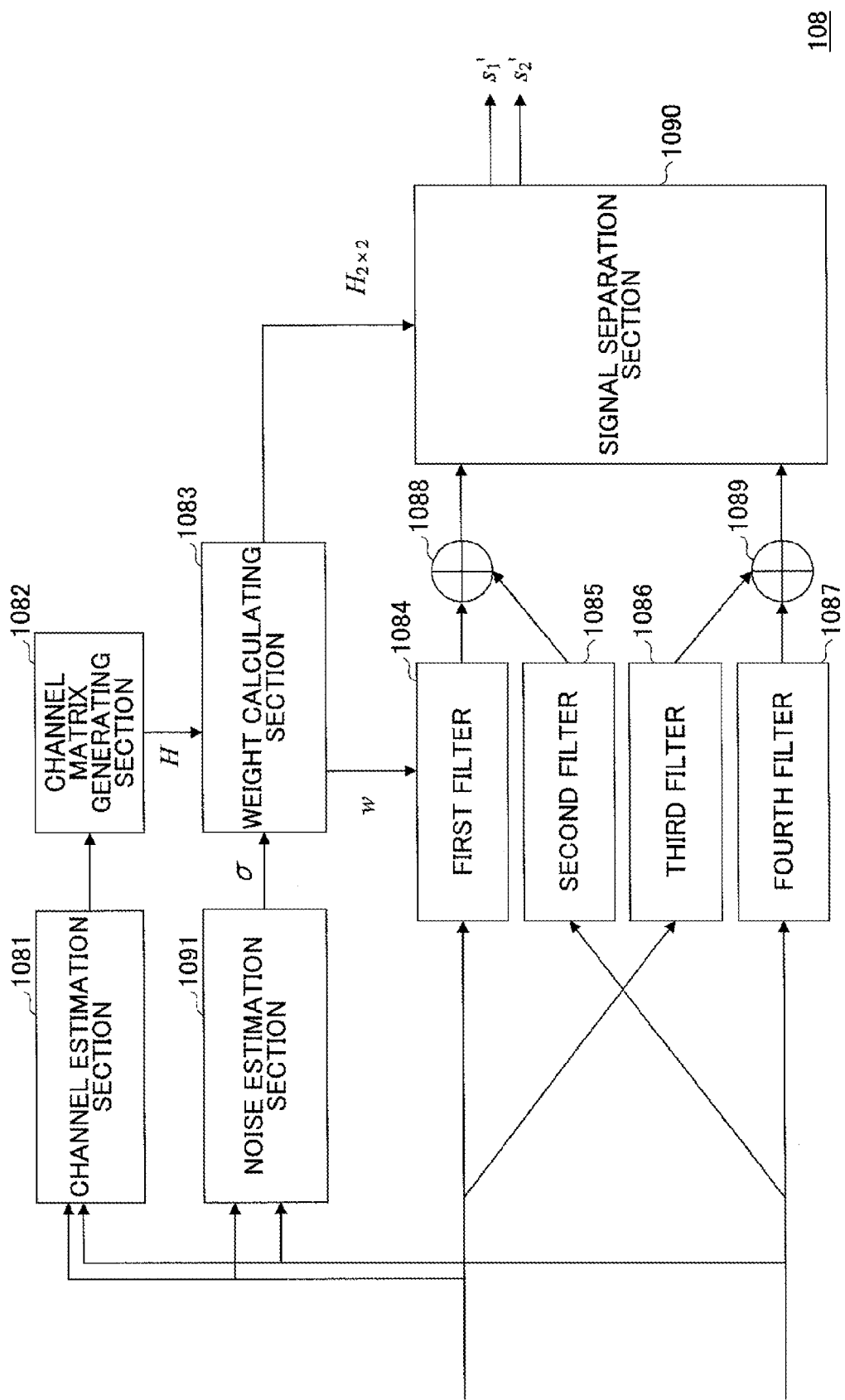
FIG. 5 is a schematic view illustrating a demodulation circuit according to a modified example.

FIG. 5 is a schematic view illustrating a demodulation circuit 108 according to the first modified example. The wireless communication apparatus 100 illustrated in FIG. 5 has two antennae. The wireless communication apparatus 100 receives a signal from another wireless communication apparatus with two antennae. If the wireless communication apparatus 100 provides more than two antennae and receives a signal from another wireless communication apparatus with more than two antennae, it is basically the same.

The demodulation circuit 108 includes a noise estimation section 1091 in addition to the elements in the demodulation circuit illustrated in FIG. 2.

Functions of the noise estimation section 1091 are implemented with hardware (digital circuit) or a processor such as a DSP (Digital Signal Processor) and the like. Alternatively, the functions of the noise estimation section 1091 may be implemented with software.

The noise estimation section 1091 is connected with the A/D converter 106. The noise estimation section 1091 estimates noise power based on a digital signal from the A/D converter 106. The noise estimation section 1091 calculates the square root of an estimated value of the noise power (called "estimated noise power value σ" hereafter). The noise estimation section 1091 inputs the estimated noise power value σ into the weight estimate section 1083.

The weight calculating section 1083 is connected with the noise estimation section 1091 and the channel matrix generating section 1082. The weight calculating section 1083 calculates weights used for the filters, the first filter 1084 to the fourth filter 1087, based on a channel matrix H from the channel matrix generating section 1082 and an estimated noise power value σ from the noise estimation section 1091.

FIG. 6 is a schematic view illustrating a process of the weight calculating section 1083 according to the first modified example. According to the first modified example of the wireless communication apparatus 100, the weight calculating section 1083 calculates weights used for the filters, the first filter 1084 to the fourth filter 1087, by MMSE-extended QR decomposition (see, for example, Non-Patent Document 1). The weight calculating section 1083 generates a channel matrix H'. The weight calculating section 1083 attaches σI (I is a unit matrix) to the channel matrix H' when applying QR decomposition to the channel matrix H'. In an example illustrated in FIG. 6, a 3×3 channel matrix H' is obtained, to which a matrix is attached that is obtained by multiplying a 3×3 unit matrix by the estimated noise power value σ (the channel matrix H" illustrated in FIG. 6), which is then applied with QR decomposition.

According to the first modified example of the wireless communication apparatus 100, an error rate characteristic can be improved by using MMSE-extended QR decomposition.

Second Modified Example

A wireless communication apparatus 100 according to a second modified example is substantially the same as the one illustrated in FIG. 1.

<Demodulation Circuit 108>

Figure 7:
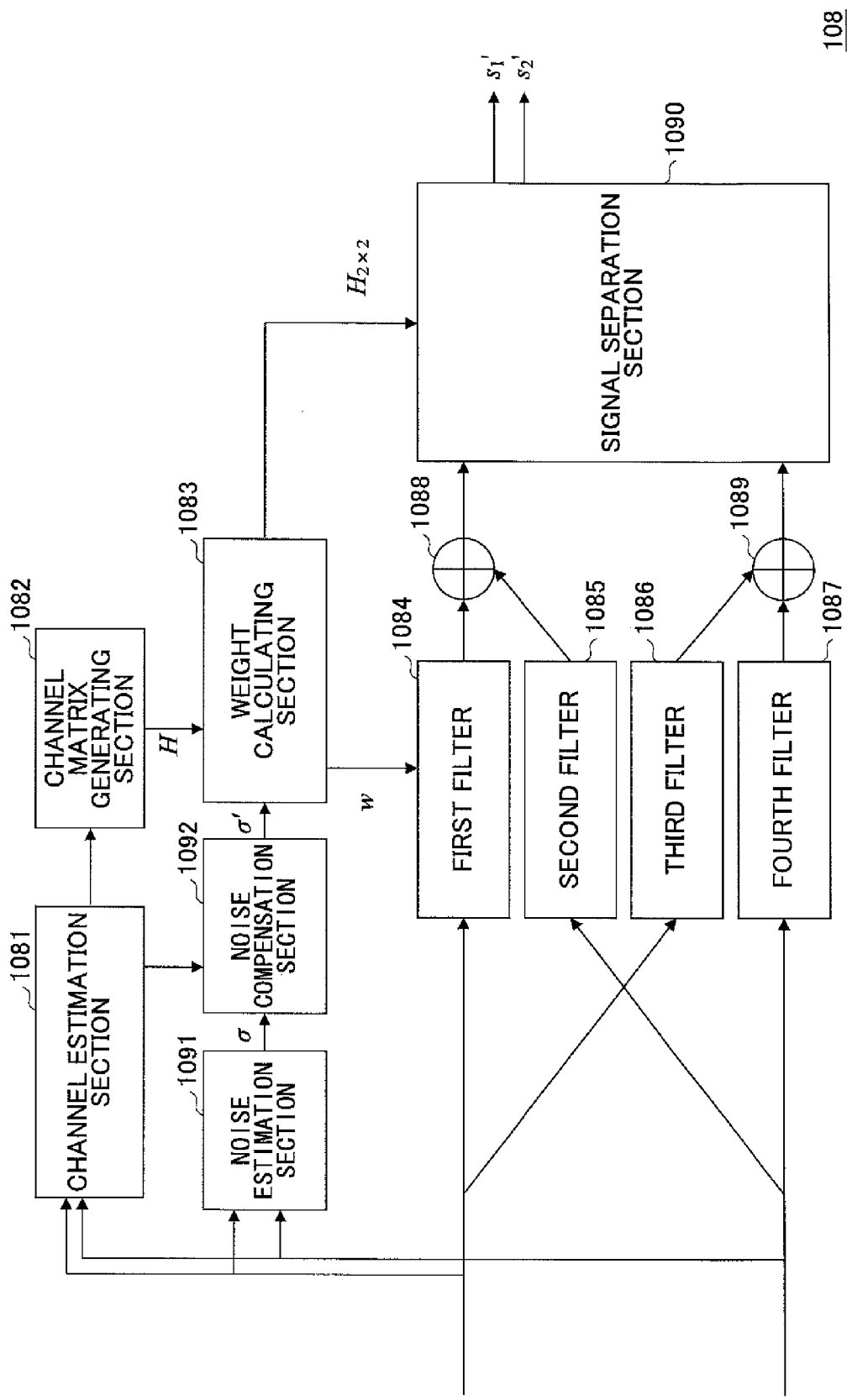
FIG. 7 is a schematic view illustrating a demodulation circuit according to a modified example.

FIG. 7 is a schematic view illustrating a demodulation circuit according to a modified example. The wireless communication apparatus 100 in FIG. 7 has two antennae according to the present embodiment. The wireless communication apparatus 100 receives a signal from another wireless communication apparatus with two antennae. If the wireless communication apparatus 100 provides more than two antennae and receives a signal from another wireless communication apparatus with more than two antennae, it is basically the same.

The demodulation circuit 108 includes a noise compensation section 1092 in addition to the elements in the demodulation circuit illustrated in FIG. 5.

Functions of the noise compensation section 1092 are implemented with hardware (digital circuit) or a processor such as a DSP (Digital Signal Processor) and the like. Alternatively, the functions of the noise compensation section 1092 may be implemented with software.

The channel estimation section 1081 inputs precision of a channel estimation value into the noise compensation section 1092. For example, the precision of a channel estimation value can be estimated from the average number of pilots and the like. The channel estimation section 1081 may input the average number of pilots and the like into the noise compensation section 1092.

The noise estimation section 1091 is connected with the A/D converter 106. The noise estimation section 1091 estimates noise power based on a signal from the A/D converter 106. The noise estimation section 1091 calculates an estimated noise power value σ. The noise estimation section 1091 inputs the estimated noise power value σ into the noise compensation section 1092.

The noise compensation section 1092 is connected with the channel estimation section 1081 and the noise estimation section 1091. The noise compensation section 1092 compensates the estimated noise power value σ from the noise estimation section 1091 based on the precision of the channel estimation value from the channel estimation section 1081. There are cases where a favorable characteristic is obtained by compensating the estimated noise power value σ to a great value if MMSE-extended QR decomposition is used and an error of the channel estimation value is great. The noise compensation section 1092 compensates the estimated noise power value σ to a great value if the precision of the channel estimation value from the channel estimation section 1081 is smaller that a predetermined threshold value. For example, the noise compensation section 1092 may compensate the estimated noise power value σ to make it $\sqrt{2}$ to two times greater. The estimated noise power value σ may be compensated to take greater values in stages with multiple threshold values. The noise compensation section 1092 inputs the compensated, estimated noise power value (called "estimated noise power value σ'" hereafter) into the weight calculating section 1083.

The weight calculating section 1083 is connected with the noise compensation section 1092 and the channel matrix generating section 1082. The weight calculating section 1083 calculates weights used for the filters, the first filter 1084 to the fourth filter 1087, based on the channel matrix H from the channel matrix generating section 1082 and the estimated noise power value σ' from the noise estimation section 1091.

According to the second modified example of the wireless communication apparatus 100, the weight calculating section 1083 calculates weights used for the filters, the first filter 1084 to the fourth filter 1087, by MMSE-extended QR decomposition (see, for example, Non-Patent Document 1). The weight calculating section 1083 generates a channel matrix H'. The weight calculating section 1083 attaches σ'I (I is a unit matrix) to the channel matrix H' when applying QR decomposition to the channel matrix H'. For example, if a 3×3 channel matrix H' is obtained, it is attached with a matrix that is obtained by multiplying a 3×3 unit matrix by the estimated noise power value σ', which is then applied with QR decomposition.

According to the second modified example of the wireless communication apparatus 100, an error rate characteristic can be improved by using an compensated, estimated noise power value.

Third Modified Example

A wireless communication apparatus 100 according to a third modified example is substantially the same as the one illustrated in FIG. 1.

<Demodulation Circuit 108>

The demodulation circuit 108 according to the third modified example is substantially the same as those illustrated in FIG. 2, FIG. 5, and FIG. 7.

The weight calculating section 1083 terminates QR decomposition with the number of components in the column direction in a channel matrix H' or a channel matrix H" if the number of components in the row direction is greater than the number of components in the column direction.

Figure 8:
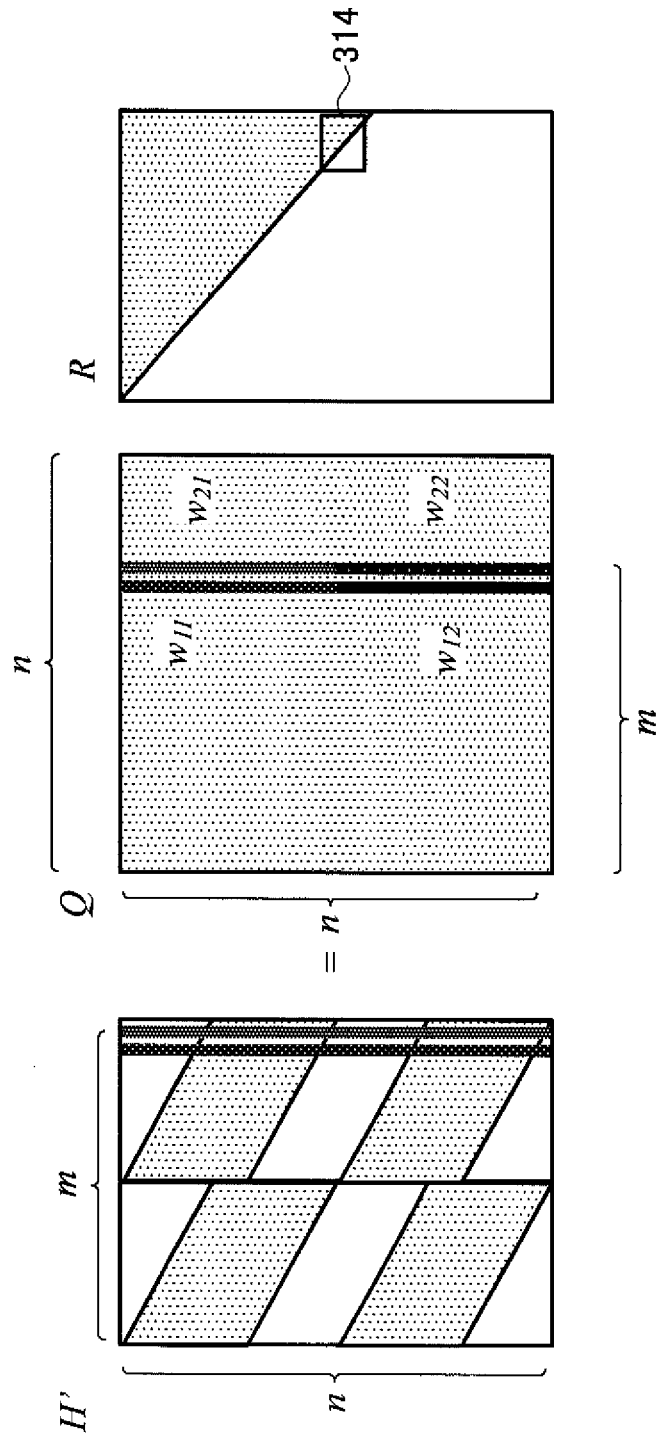
FIG. 8 is a schematic view illustrating a weight calculating process according to a modified example.

FIG. 8 is a schematic view illustrating a process of the weight calculating section 1083 the according to the third modified example. Although FIG. 8 illustrates an example with a channel matrix H', it is applicable to a channel matrix H".

In FIG. 8, n denotes the number of components in the row direction in a channel matrix H', and m denotes the number of components in the column direction. If n>m, all components in Q matrix do not need to be calculated. For example, the weight calculating section 1083 calculates up to the m-th column of Q matrix, then terminates. If Gram-Schmidt orthogonalization is used as an orthogonalization process, Q matrix is calculated from the first column to the m-th column as the rest of the columns do not have an influence of an error rate characteristic.

According to the third modified example of the wireless communication apparatus 100, a calculation amount by the demodulation circuit 108 can be reduced by executing QR decomposition for a part of components.

Fourth Modified Example

A wireless communication apparatus 100 according to a fourth modified example is substantially the same as the one illustrated in FIG. 1.

<Demodulation Circuit 108>

Figure 9:
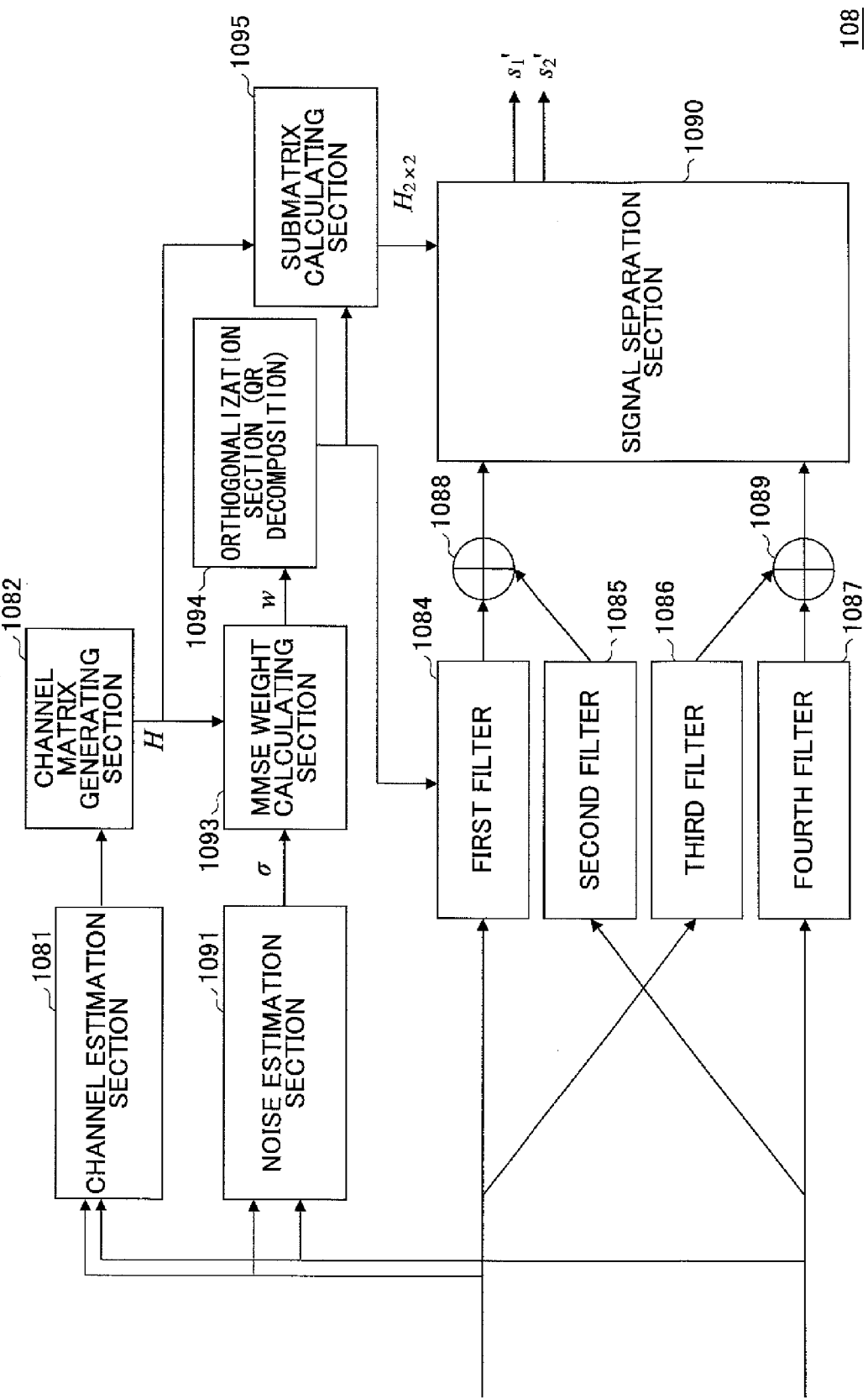
FIG. 9 is a schematic view illustrating a demodulation circuit according to a modified example.

FIG. 9 is a schematic view illustrating a demodulation circuit 108 according to the fourth modified example. According to the fourth modified example, the demodulation circuit 108 includes a noise estimation section 1091, an MMSE weight calculating section 1093, an orthogonalization section 1094, and a submatrix calculating section 1095, instead of the weight calculating section 1083 in the demodulation circuit 108 illustrated in FIG. 2.

Functions of the noise estimation section 1091, the MMSE weight calculating section 1093, the orthogonalization section 1094, and the submatrix calculating section 1095 are implemented with hardware (digital circuit) or a processor such as a DSP (Digital Signal Processor) and the like. Alternatively, the functions of the noise estimation section 1091, the MMSE weight calculating section 1093, the orthogonalization section 1094, and the submatrix calculating section 1095 may be implemented with software.

The noise estimation section 1091 is connected with the A/D converter 106. The noise estimation section 1091 estimates noise power based on a signal from the A/D converter 106. The noise estimation section 1091 calculates an estimated noise power value $\sigma$. The noise estimation section 1091 inputs the estimated noise power value $\sigma$ into the MMSE weight calculating section 1093.

The MMSE weight calculating section 1093 is connected with the channel matrix generating section 1082 and the noise estimation section 1091. The MMSE weight calculating section 1093 calculates weight coefficients based on the estimated noise power value $\sigma$ from the noise estimation section 1091 and the channel matrix from the channel matrix generating section 1082. For example, the weight coefficients w may be calculated by Formula (9). For example, the weight coefficients w are represented with a two-column matrix h that is extracted from H where the two columns correspond to timing for demodulation.

$$w = (HH^H + \sigma hu\, 2I)^{-1} h \qquad (9)$$

The MMSE weight calculating section 1093 inputs the weight coefficients into the orthogonalization section 1094.

The orthogonalization section 1094 is connected with the MMSE weight calculating section 1093 and the first filter 1084 to the fourth filter 1087. The orthogonalization section 1094 applies QR decomposition to the weight coefficients from the MMSE weight calculating section 1093. The orthogonalization section 1094 extracts weights from Q matrix obtained with QR decomposition. The orthogonalization section 1094 inputs the weights into the first filter 1084 to the fourth filter 1087. The orthogonalization section 1094 also inputs the weights into the submatrix calculating section 1095.

The submatrix calculating section 1095 is connected with the channel matrix generating section 1082, the orthogonalization section 1094, and the signal separation section 1090. The submatrix calculating section 1095 calculates a submatrix based on the channel matrix from the channel matrix generating section 1082 and the weights from the orthogonalization section 1094. The submatrix calculating section 1095 inputs the submatrix $H_{2 \times 2}$ into the signal separation section 1090.

In the third modified example described above, the channel matrix H' or the channel matrix H" is applied with QR decomposition for obtaining equalizer weights. Here, weights can be obtained similarly applying QR decomposition to the equalizer weights because Q matrix is an orthogonal matrix.

The wireless communication apparatus 100 obtains orthogonal weights by applying QR decomposition to the equalizer weights. The wireless communication apparatus 100 uses the orthogonal weights as the equalizer weights.

Fifth Modified Example

A wireless communication apparatus 100 according to a fifth modified example is substantially the same as the one illustrated in FIG. 1.

<Demodulation Circuit 108>

Figure 10:
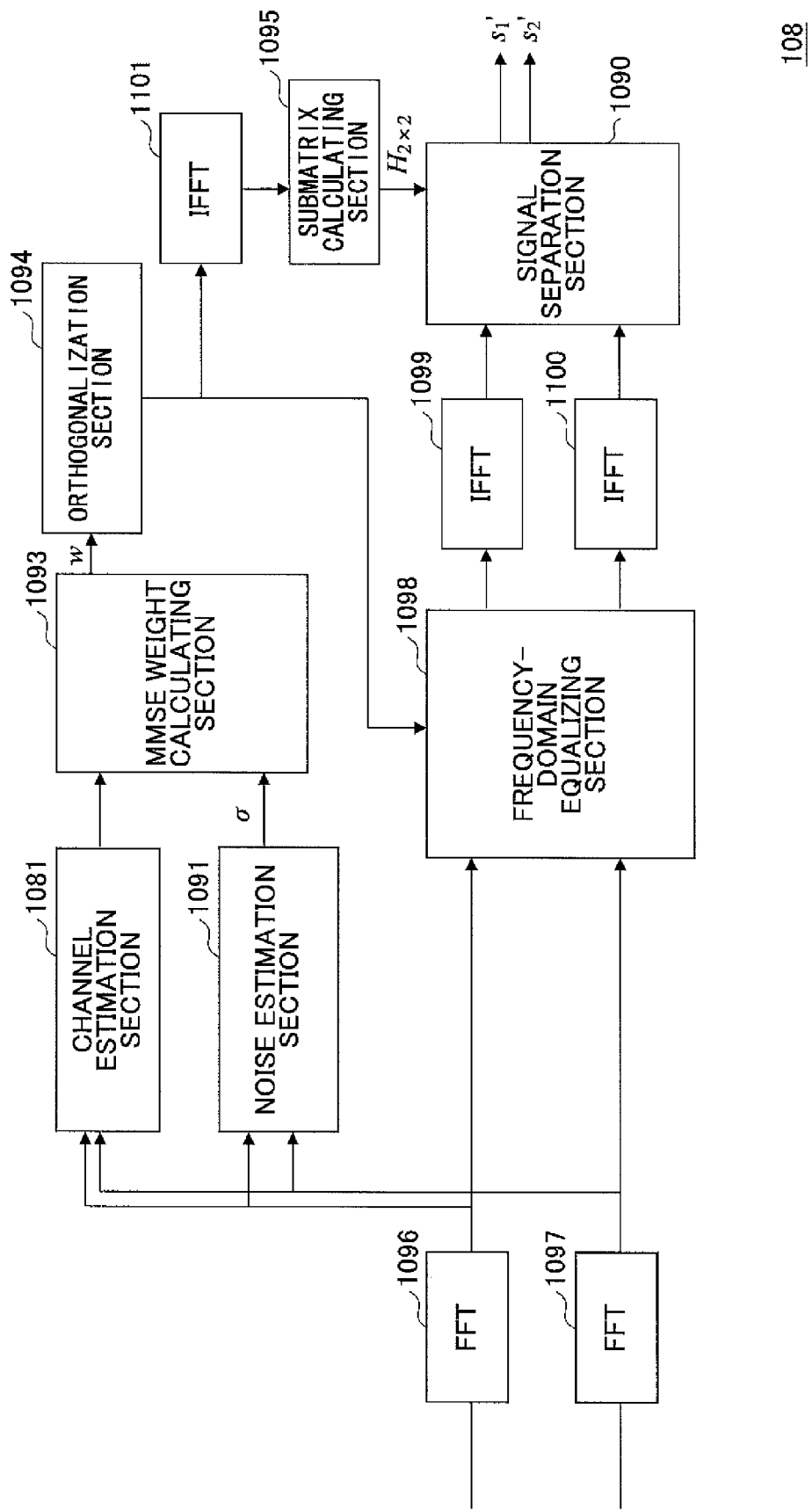
FIG. 10 is a schematic view illustrating a demodulation circuit according to a modified example.

FIG. 10 is a schematic view illustrating a demodulation circuit 108 according to the fifth modified example.

The demodulation circuit 108 includes FFT sections 1096 and 1097, a channel estimation section 1081, a noise estimation section 1091, an MMSE weight calculating section 1093, an orthogonalization section 1094, a frequency-domain equalizing section 1098, IFFT sections 1099, 1100 and 1101, a submatrix calculating section 1095, and a signal separation section 1090.

Functions of the FFT sections 1096 and 1097, the channel estimation section 1081, the noise estimation section 1091, the MMSE weight calculating section 1093, the orthogonalization section 1094, the frequency-domain equalizing section 1098, the IFFT sections 1099, 1100 and 1101, the submatrix calculating section 1095, and the signal separation section 1090 are implemented with hardware (digital circuit) or a processor such as a DSP (Digital Signal Processor) and the like. Alternatively, the functions of the FFT sections 1096 and 1097, the channel estimation section 1081, the noise estimation section 1091, the MMSE weight calculating section 1093, the orthogonalization section 1094, the frequency-domain equalizing section 1098, the IFFT sections 1099, 1100 and 1101, the submatrix calculating section 1095, and the signal separation section 1090 may be implemented with software.

The FFT sections 1096 and 1097 are connected with the A/D converter 106. The FFT sections 1096 and 1097 applies fast Fourier transform to signals from the antennae from the A/D converter 106. The signals having fast Fourier transform applied at the FFT sections 1096 and 1097 are input to the channel estimation section 1081, the noise estimation section 1091, and the frequency-domain equalizing section 1098.

The channel estimation section 1081 is connected with the FFT sections 1096 and 1097. The channel estimation section 1081 executes channel estimation to represent a characteristic of a transmission line between a transmitting antenna and a receiving antenna for each subcarrier signal based on the signals from the FFT sections 1096 and 1097. The channel estimation section 1081 inputs the channel estimation value into the MMSE weight calculating section 1093.

The noise estimation section 1091 is connected with the FFT sections 1096 and 1097. The noise estimation section 1091 estimates noise power based on the signal from the FFT sections 1096 and 1097. The noise estimation section 1091 calculates an estimated noise power value $\sigma$. The noise estimation section 1091 inputs the estimated noise power value $\sigma$ into the MMSE weight calculating section 1093.

The MMSE weight calculating section 1093 is connected with the channel estimation section 1081 and the noise estimation section 1091. The MMSE weight calculating section 1093 calculates weight coefficients based on the channel estimation value from the channel estimation section 1081 and the estimated noise power value $\sigma$ from the noise estimation section 1091. For example, the weight coefficients w may be calculated by Formula (9). For example, the weight coefficients w are represented with a two-column matrix. The MMSE weight calculating section 1093 inputs the weight coefficients into the orthogonalization section 1094.

The orthogonalization section 1094 is connected with the MMSE weight calculating section 1093. The orthogonalization section 1094 applies QR decomposition to the weight coefficients from the MMSE weight calculating section 1093. The orthogonalization section 1094 extracts weights from Q matrix obtained with QR decomposition. The orthogonalization section 1094 inputs the weights into the frequency-domain equalizing section 1098. The orthogonalization section 1094 also inputs the weights into the IFFT section 1101.

The IFFT section 1101 is connected with the orthogonalization section 1094. The IFFT section 1101 applies inverse fast Fourier transform to the weights from the orthogonalization section 1094. The IFFT section 1101 inputs the weights having inverse fast Fourier transform applied into the submatrix calculating section 1095.

The submatrix calculating section 1095 is connected with the IFFT section 1101. The submatrix calculating section 1095 calculates a submatrix $H_{2\times 2}$ based on the weights having inverse fast Fourier transform applied by the IFFT section 1101. The submatrix calculating section 1095 inputs the submatrix $H_{2\times 2}$ into the signal separation section 1090.

The submatrix calculating section 1095 obtains MMSE weights $w'_{ij}$. For example, the submatrix calculating section 1095 obtains the MMSE weights w'ij by Formula (10).

$$\begin{pmatrix} w'_{11} & w'_{12} \\ w'_{21} & w'_{22} \end{pmatrix} = R^{-1} \begin{pmatrix} h_{11} & h_{12} \\ h_{21} & h_{22} \end{pmatrix} \quad (10)$$

In Formula (10), R is a correlation matrix obtained from H matrix illustrated in FIG. 3, which is represented by Formula (11).

$$R = HH^H + \sigma^2 I \quad (11)$$

In Formula (10), $h_{ij}$ denotes a channel for a symbol to be demodulated.

Figure 11:
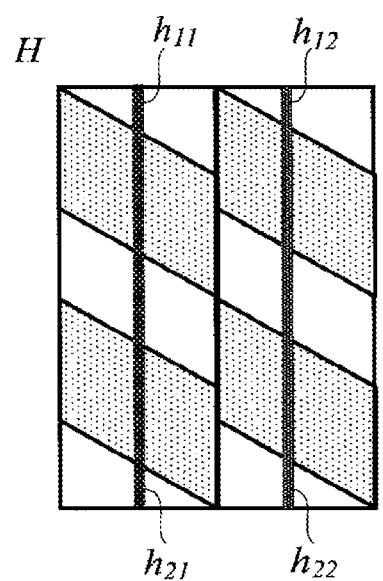
FIG. 11 is a schematic view illustrating a weight calculating process according to a modified example.

FIG. 11 is a schematic view illustrating a weight calculating process according to the present modified example. FIG. 11 illustrates calculation of $h_{ij}$. $h_{ij}$ is a column vector with components extracted from H matrix.

$h_{ij}$ is a column vector, so is the MMSE weights $w'_{ij}$ with Formula (10).

The submatrix calculating section 1095 applies QR decomposition to the left hand side of Formula (10). The submatrix calculating section 1095 obtains orthogonalization weights $w_{ij}$ by extracting the leftmost two columns from Q matrix.

Figure 12:
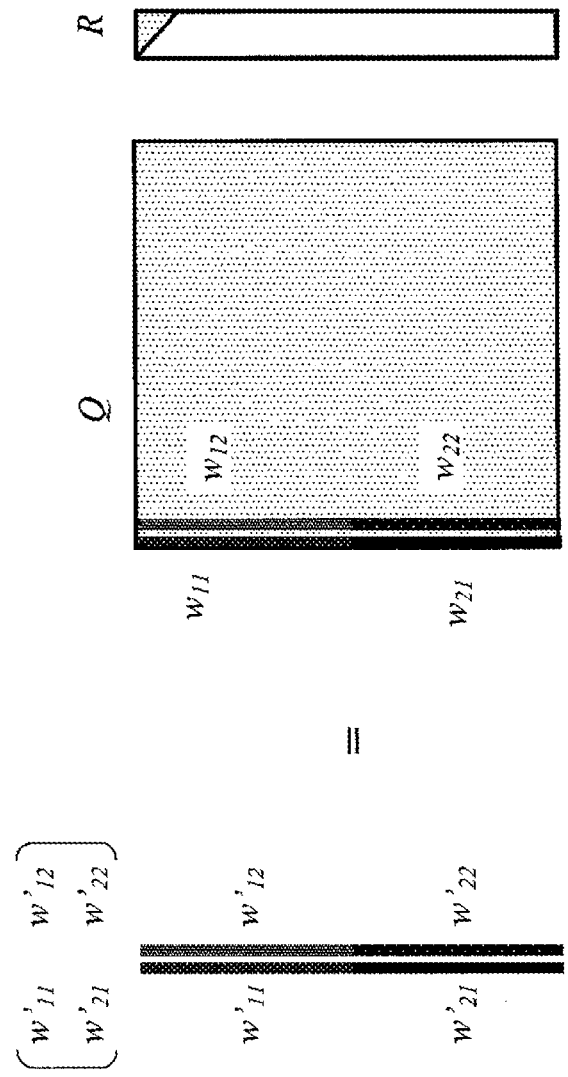
FIG. 12 is a schematic view illustrating a weight calculating process according to a modified example.

FIG. 12 is a schematic view illustrating a weight calculating process according to the present modified example. FIG. 12 illustrates calculation of orthogonalization weights.

The submatrix calculating section 1095 applies QR decomposition to the left hand side of Formula (10), which are column vectors, extracts the leftmost two columns from Q matrix to move the columns to the left side.

The submatrix calculating section 1095 calculates $H_{2\times 2}$ from $w_{ij}$ and $h_{ij}$. For example, the submatrix calculating section 1095 calculates $H_{2\times 2}$ by Formula (12) where $H_{2\times 2}$ is a 2×2 matrix.

$$H_{2\times 2} = \begin{pmatrix} w_{11} & w_{12} \\ w_{21} & w_{22} \end{pmatrix}^H \begin{pmatrix} h_{11} & h_{12} \\ h_{21} & h_{22} \end{pmatrix} = \begin{pmatrix} w_{11}^H h_{11} + w_{21}^H h_{21} & w_{11}^H h_{12} + w_{21}^H h_{22} \\ w_{12}^H h_{11} + w_{22}^H h_{21} & w_{12}^H h_{12} + w_{22}^H h_{22} \end{pmatrix} \quad (12)$$

The frequency-domain equalizing section 1098 is connected with the FFT sections 1096 and 1097. The frequency-domain equalizing section 1098 executes an equalization process by weighting signals from the FFT sections 1096 and 1097 with the weights w from the orthogonalization section 1094. The frequency-domain equalizing section 1098 inputs the signal from the FFT section 1096 after the equalization process into the IFFT section 1099. The frequency-domain equalizing section 1098 inputs the signal from the FFT section 1097 after the equalization process into the IFFT section 1100.

The IFFT section 1099 applies inverse fast Fourier transform to the signal from the frequency-domain equalizing section 1098. The IFFT section 1099 inputs the signal having inverse fast Fourier transform applies into the signal separation section 1090.

The IFFT section 1100 applies inverse fast Fourier transform to the signal from the frequency-domain equalizing section 1098. The IFFT section 1100 inputs the signal applies having inverse fast Fourier transform applies into the signal separation section 1090.

The signal separation section 1090 executes signal separation based on the signal from the IFFT section 1099, the signal from the IFFT section 1100, and the submatrix $H_{2\times 2}$ from the submatrix calculating section 1095.

In the fourth modified example described above, a time-domain signal is applied with an equalizer. In the fifth modified example, a frequency-domain signal is applied with an equalizer. Specifically, a received signal is converted into a frequency-domain signal by applying FFT to the received signal. MMSE equalizer weights in the frequency domain are calculated from the frequency-domain signal. Orthogonalized weights are used as weights in a frequency-domain equalizer.

The equalized signal is applied with IFFT to be converted into a time-domain signal to be applied with MLD. Here, the propagation channel matrix $H_{2\times 2}$ is calculated from values obtained when applying IFFT to the orthogonalized frequency-domain weights.

<Error Rate Characteristic>

Figure 13:
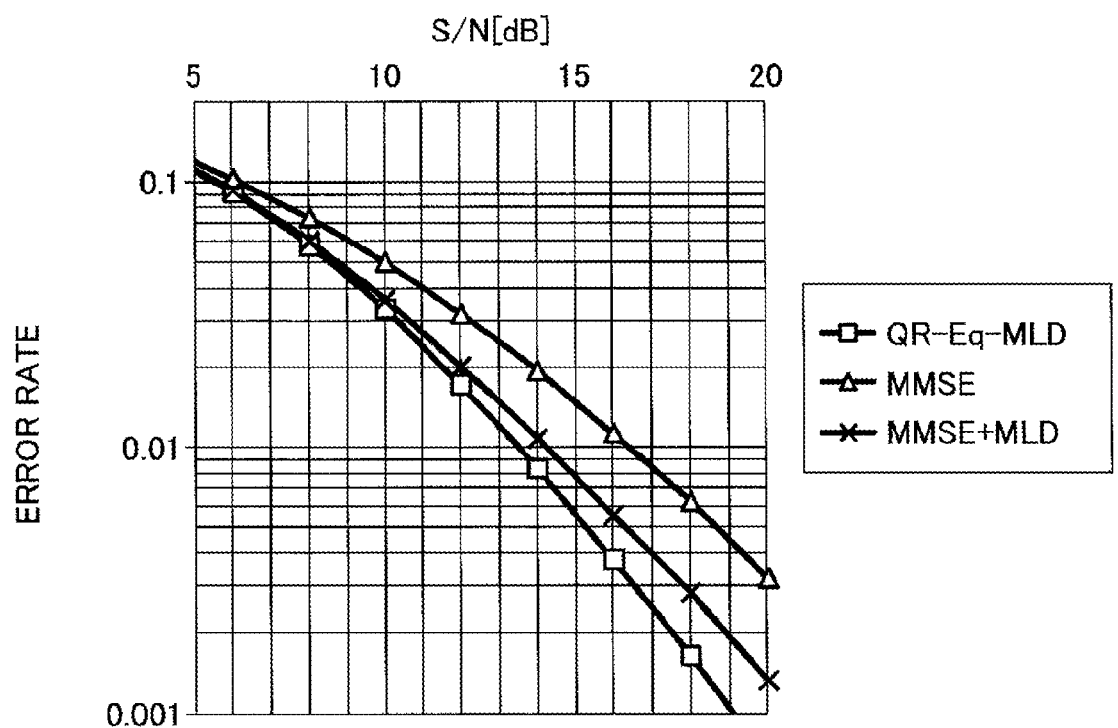
FIG. 13 is a schematic view illustrating an example of an error rate characteristic.

FIG. 13 is a schematic view illustrating an example of error rate characteristics. In FIG. 13, the horizontal axis represents S/N [dB], and the vertical axis represents error rates.

FIG. 13 illustrates an error rate characteristic obtained with the wireless communication system according to the first modified example (QR–Eq–MLD), an error rate characteristic having MMSE applied (MMSE), and an error rate characteristic having MMSE and MLD applied (MMSE+MLD).

As illustrated in FIG. 13, regardless of S/N, the error rate characteristic obtained with the wireless communication system according to the first modified example (QR–Eq–MLD) is better than the other characteristics. Therefore, an error rate characteristic can be improved with the embodiments and modified examples.

Figure 14:
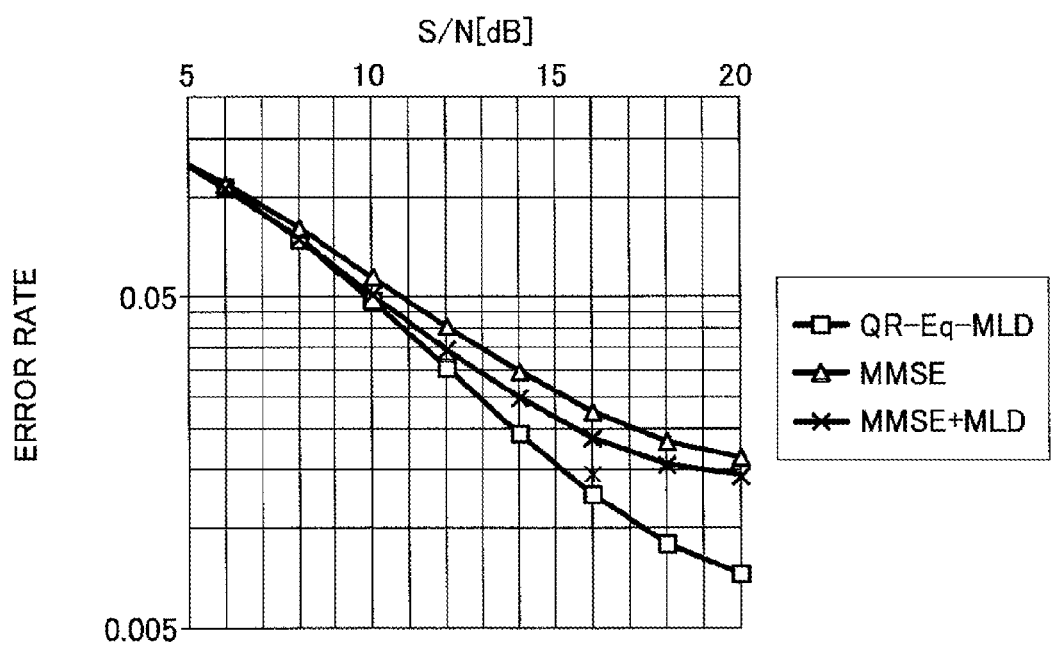
FIG. 14 is a schematic view illustrating an example of an error rate characteristic.

FIG. 14 is a schematic view illustrating another example of error rate characteristics. In FIG. 14, the horizontal axis represents S/N [dB], and the vertical axis represents error rates.

The error rate characteristics illustrated in FIG. 14 are obtained with adding error differences to channels when calculating error rates.

FIG. 14 illustrates an error rate characteristic obtained with the wireless communication system according to the first modified example (QR–Eq–MLD), an error rate characteristic having MMSE applied (MMSE), and an error rate characteristic having MMSE and MLD applied (MMSE+MLD).

As illustrated in FIG. 14, regardless of S/N, the error rate characteristic obtained with the wireless communication system according to the first modified example (QR–Eq–MLD) is better than the other characteristics. Therefore, an error rate characteristic can be improved with the embodiments and modified examples.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication apparatus comprising:
 a wireless section configured to receive a plurality of signals via a plurality of antennae from a transmitting device having another plurality of antennae; and
 a demodulation section configured to apply QR decomposition to a channel matrix generated based on the received signals from the wireless section, to extract, from a unitary matrix Q, a plurality of weight coefficients corresponding to a symbol to be demodulated, to filter the received signals using the weight coefficients, and to separate the filtered received signals based on a submatrix of an upper triangular matrix R.

2. The wireless communication apparatus as claimed in claim 1, wherein the demodulation section applies MMSE-extended QR decomposition to the channel matrix using noise power estimated based on the received signals.

3. The wireless communication apparatus as claimed in claim 1, wherein the demodulation section compensates noise power estimated based on the received signals depending on channel estimation precision, then using the compensated noise power, applies MMSE-extended QR decomposition to the channel matrix.

4. The wireless communication apparatus as claimed in claim 1, wherein the demodulation section shifts a column in a channel matrix generated based on the received signals from the wireless section to a right side, the column corresponding to a symbol to be demodulated, then applies QR decomposition to the channel matrix.

5. A wireless communication apparatus as claimed in claim 1, wherein the demodulation section separates the filtered received signals using an MLD method.

6. A wireless communication apparatus as claimed in claim 1, wherein when applying QR decomposition to the channel matrix, the demodulation section terminates QR decomposition with a number of components in a column direction in the channel matrix if a number of components in a row direction is greater than the number of components in the column direction.

7. A wireless communication apparatus comprising:
 a wireless section configured to receive a plurality of signals via a plurality of antennae from a transmitting device having another plurality of antennae; and
 a demodulation section configured to calculate a plurality of weight coefficients based on a channel matrix generated based on the received signals from the wireless section, to obtain a unitary matrix Q by applying QR decomposition to the weight coefficients, to extract from the unitary matrix Q a plurality of orthogonalized weights, to filter the received signals using the orthogonalized weights, and to separate the filtered received signals based on the orthogonalized weights and a submatrix generated based on the channel matrix.

8. A wireless communication apparatus comprising:
 a wireless section configured to receive a plurality of signals via a plurality of antennae from a transmitting device having another plurality of antennae; and
 a demodulation section configured to calculate a plurality of weight coefficients based on a channel matrix generated based on the received signals from the wireless section, to obtain a unitary matrix Q by applying QR decomposition to the weight coefficients, to extract from the unitary matrix Q a plurality of orthogonalized weights, to apply an equalization process to the received signals based on the orthogonalized weights, and to separate the received signals having the equalization process applied based on a submatrix generated based on the orthogonalized weights.

9. A wireless communication method comprising:
 receiving a plurality of signals via a plurality of antennae from a transmitting device having another plurality of antennae;
 applying QR decomposition to a channel matrix generated based on the received signals from the wireless section;
 extracting, from a unitary matrix Q, a plurality of weight coefficients corresponding to a symbol to be demodulated;
 filtering the received signals using the weight coefficients; and
 separating the filtered received signals based on a submatrix of an upper triangular matrix R.

10. A baseband processing large-scale integrated circuit LSI comprising:
 a demodulation section configured to apply QR decomposition to a channel matrix generated based on a plurality of received signals, to extract, from a unitary matrix Q, a plurality of weight coefficients corresponding to a symbol to be demodulated, to filter the received signals using the weight coefficients, and to separate the filtered received signals based on a submatrix of an upper triangular matrix R.

* * * * *